United States Patent [19]
Ozue

[11] Patent Number: 6,141,166
[45] Date of Patent: Oct. 31, 2000

[54] RECORDING HEAD ARRANGEMENT FOR A MAGNETIC RECORDING DEVICE HAVING A MULTICHANNEL RECORDING MODE

[75] Inventor: Tadashi Ozue, Kanagawa, Japan

[73] Assignee: Sony Corporation, Tokyo, Japan

[21] Appl. No.: 09/085,616

[22] Filed: May 27, 1998

[30] Foreign Application Priority Data

May 30, 1997 [JP] Japan ................................. 9-142799

[51] Int. Cl.$^7$ .................................................. G11B 15/14
[52] U.S. Cl. ............................................................ 360/64
[58] Field of Search .......................................... 360/61, 64

[56] References Cited

U.S. PATENT DOCUMENTS 5,359,471 10/1994 Hasegawa .................................. 360/64

Primary Examiner—W. Chris Kim
Attorney, Agent, or Firm—Frommer Lawrence & Haug, LLP.; William S. Frommer; Matthew K. Ryan

[57] ABSTRACT

A magnetic recording device incorporating both a 2-channel recording mode and a multichannel recording mode in one piece of equipment and using recording heads in multiples of two. This magnetic recording device is provided with a head drum, a pair of magnetic recording heads W1+ and W2− of a head width Hw and arranged in mutual proximity and along the rotation direction of the head drum, and a pair of magnetic recording heads W1− and W2+ of a head width Hw/2 and arranged in proximity to the magnetic recording head W2−. These magnetic recording heads W1+, W2−, W1−, W2+ are positioned so that the upper edge of the magnetic recording head W1+, the lower edge of the magnetic recording head W2−, the upper edge of the magnetic recording head W1− and the lower edge of the magnetic recording head W2+ are on the imaginary common line along the rotation direction of the head drum. Information is recorded by the magnetic recording heads W1− and W2+ on both sides of the boundary line of the recording tracks of the recording tape medium previously recorded upon by the magnetic recording heads W1+ and W2−.

7 Claims, 9 Drawing Sheets

RECORDING HEAD ARRANGEMENT FOR A MAGNETIC RECORDING DEVICE HAVING A MULTICHANNEL RECORDING MODE

BACKGROUND OF THE INVENTION

1. Field of the Invention

This invention relates to a magnetic recording device suitable for use with video tape recorders. More specifically, to an azimuth recording method magnetic recording/reproducing device incorporating a 2-channel and a 4-channel recording mode in one device in which a pair of magnetic recording heads for a first head width, and a pair of magnetic recording heads for a second head width narrower than the first head width are installed along a common imaginary line along the direction of head drum rotation, and information recorded by means of the magnetic head pair for the second head width is overlapped on both sides of the boundary lines of the magnetic recording zone of the tape recording medium already recorded upon by the magnetic head pair for the first head width.

2. Description of Related Art

In recent years, many video tape recorders utilize an azimuth recording system for high density recording of audio and video signals. In video tape recorders using this method, a pair of recording heads having an azimuth angle are installed on the head drum, and the head drum rotates so that the recording head diagonally scans the tape record medium (hereafter referred to as "tape"). Information is first recorded on the tape recording surface by means of the lead recording head and after this recording, information is continuously recorded by means of a lag recording head which follows up the action of the lead recording head.

Figure 12:
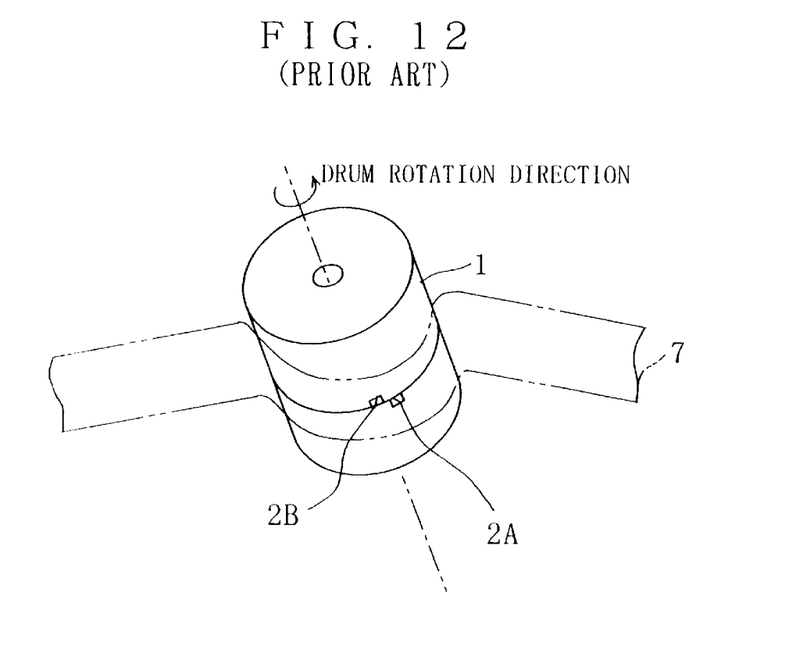
FIG. 12 is a drawing showing the structure of the magnetic recording/reproducing device of the conventional art.

The structure of a magnetic recording/reproducing device of the conventional art using the azimuth recording system is shown in FIG. 12. A pair of magnetic recording heads (hereafter called "recording heads") 2A and 2B are installed in mutual proximity along the rotation direction of the drum. The recording head 2A is the lead (or prior) head and the recording head 2B is the lag (or follow-up) head. A tape 7 is scanned while wound 180 degrees around the drum as shown in the figure.

Figure 13:
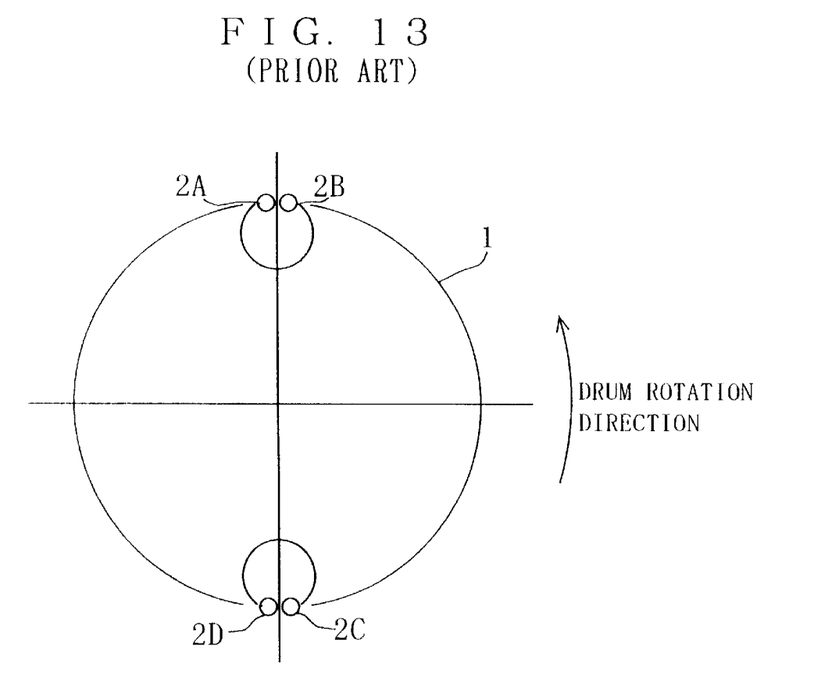
FIG. 13 is a drawing showing an example of recording head and reproduction head arrangement.

A pair of magnetic heads for reproduction (hereafter called "reproduction heads") 2C and 2D are installed in a position 180 degrees deviated from the recording heads 2A and 2B on the head drum 1 as shown in FIG. 13.

Figure 14:
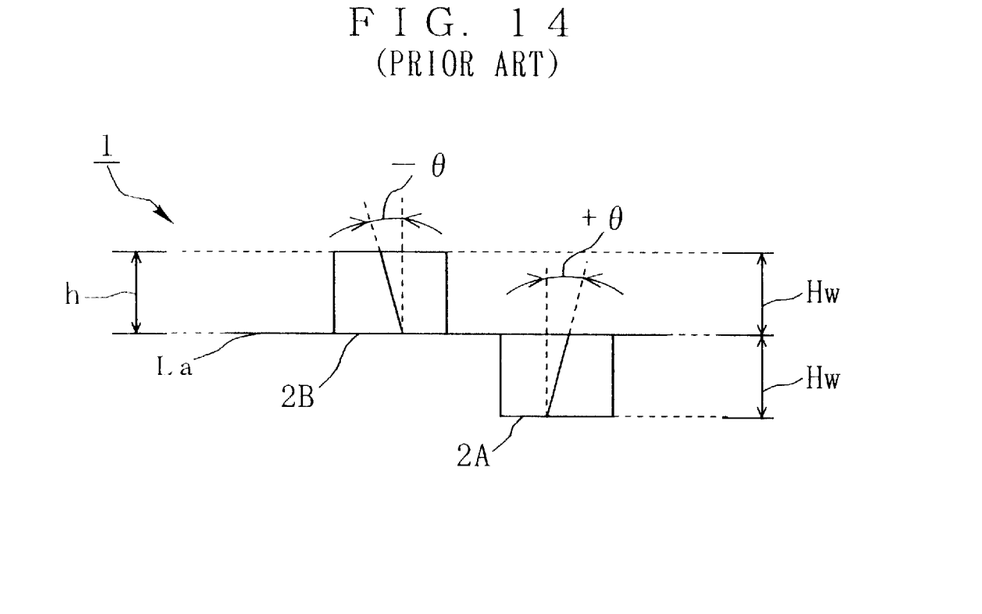
FIG. 14 is a diagram showing an example of arrangement of the recording heads 2A and 2B.

On the head gap surface of this pair of recording heads 2A and 2B, the upper edge of the lead recording head 2A and the lower edge of the lag recording head 2B are arranged on the common line La as shown in FIG. 14. In other words, comprising a high density recording method without a guard band.

Figure 15:
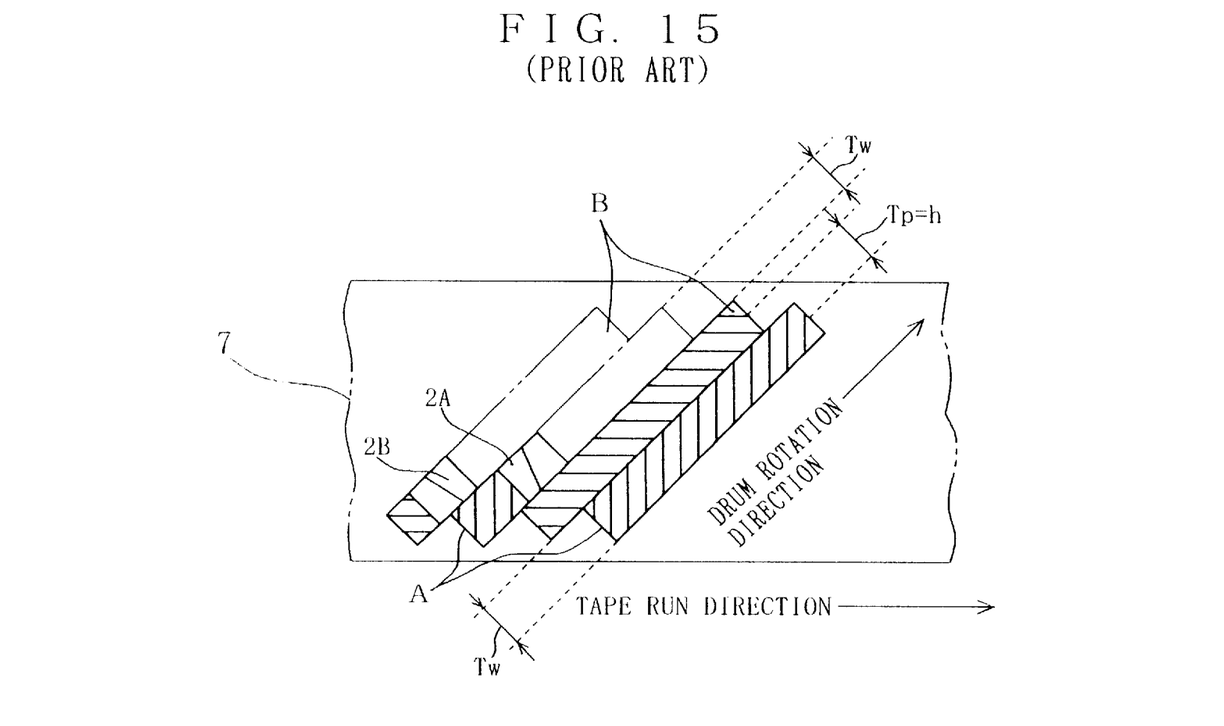
FIG. 15 is a drawing showing magnetic head recording status for the recording heads 2A and 2B.

When the azimuth angle of the recording head 2A is +θ, the azimuth angle of the other recording head 2B is selected at −θ. The head width Hw of the recording head 2A is the track width Tw. The head width Hw of the recording head 2B is the track width Tw as shown in FIG. 15.

However, when required that a large amount of information be capable of being recorded on the tape 7, if recording is performed without a guard band while the height difference h which is a difference between the upper edge of the recording head 2A and the upper edge of the recording head 2B as shown in FIG. 14 is reduced, then a large amount of information can be recorded compared to when the height difference h is equal to the head width Hw of the recording head 2B. For instance, when the recording head 2B is placed so that the head difference h is one half of the head width Hw, then when the tape drive speed is set to 2·Tw, twice the amount of recording information can then be recorded on the same length of tape.

However, in the magnetic recording/reproducing device of the conventional art, this height difference h is fixed at the time when the recording heads 2A and 2B are installed on the head drum 1. This height difference h as is, becomes the track width (=track pitch Tp ) Tw as shown in FIG. 15.

Consequently, even if able to reduce the height difference h and perform high density recording, setting the track width Tw to half the size and performing 4-channel recording makes it impossible to record information at double the density on the tape 7 or return the track width to the former width and make recordings for a 2-channel recording mode device.

Consequently, the problem exists that when tape editing for 2-channel record mode devices and tape editing for 4-channel record mode devices is required, 2-channel recording mode and a 4-channel recording mode cannot both be performed in one magnetic recording/reproducing device.

SUMMARY OF THE INVENTION

In view of the above problems, it is therefore an object of this invention to provide a magnetic recording device having both a 2-channel recording mode and a multi channel recording mode and using recording heads in multiples of two.

According to an aspect of the invention, there is provided a magnetic recording device for recording information by diagonally scanning a head drum along the direction of tape recording medium, comprising: a head drum; a first and second recording heads of a first head width installed in mutual proximity along the rotation direction of said head drum; a third and fourth recording heads having a second head with a width narrower than said first head width and installed in proximity to said first and second recording heads; and an imaginary common line formed along the rotation direction of said head drum; wherein said first, second, third and fourth recording heads are arranged on the imaginary common line while the upper edges of said first and third recording heads and, the lower edges of said second and fourth recording heads are aligned with said imaginary common line, and information is recorded by said third and fourth recording heads onto both sides of the boundary line over the previously formed first and second magnetic recording zones of the tape recording medium by the first and second recording heads.

In the magnetic recording device of this invention, by simultaneously using the pair of magnetic heads for the first recording width and the pair of magnetic heads for the second recording width, information can be recorded in a 4-channel recording mode which has one half the track width used during 2-channel recording and twice the information of that recorded in 2-channel recording mode can be recorded on the same amount of tape recording medium. Further, when only the recording operation is selected for the magnetic head pair for the first head width, information can be recorded in 2-channel recording mode in a track width dependent on the first head width, and information can be recorded on a tape recording medium for a device using 2-channel recording mode.

Accordingly, both a 2-channel record mode and a 4-channel record mode can be utilized in one magnetic recording device. Such a device allows a media source to be edited on tape for a device compatible with a 2-channel recording mode and also editing of tape for a device compatible with a 4-channel recording mode.

DETAILED DESCRIPTION OF THE PREFERRED EMBODIMENTS

Hereafter, the embodiment of this invention will be described while referring to the accompanying drawings.

First Embodiment

Figure 1:
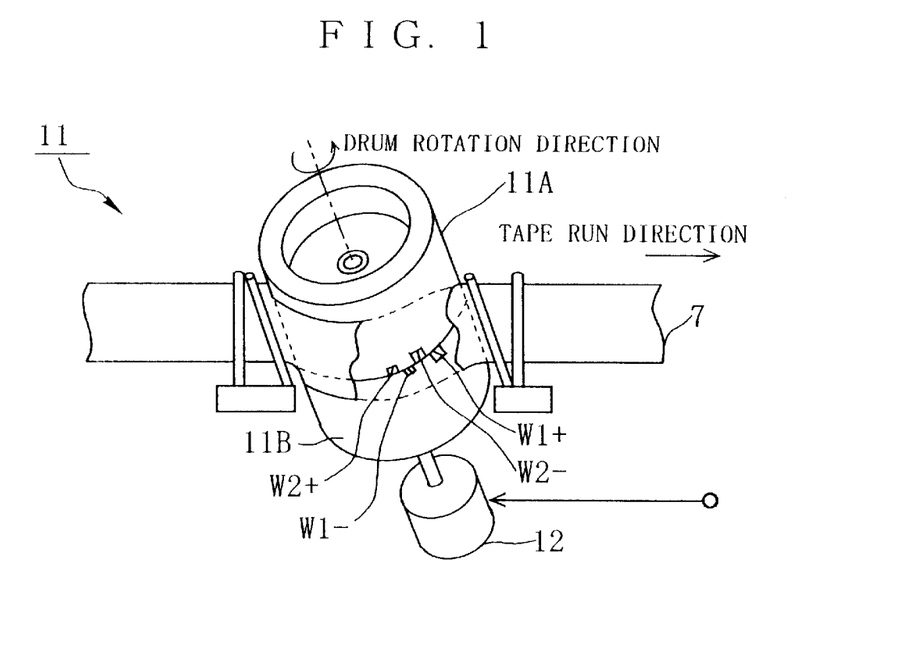
FIG. 1 is a drawing showing the structure of the magnetic recording/reproducing device of the first embodiment of this invention.

FIG. 1 is a drawing showing the structure of the head drum periphery of the magnetic recording/reproducing device of the first embodiment of this invention.

In the embodiment of this invention, a magnetic head pair of a second head width which is narrower than a first head width, records information on both sides of the boundary lines of the magnetic recording zone of the tape recording medium already recorded upon by the magnetic head pair of the first head width so that, a 2-channel record mode for recording information using only the recording head pair of the first head width, and a 4-channel recording mode for recording information simultaneously using both the recording head pair of the second head width and the recording pair of the first head width can both be incorporated into one piece of equipment.

Taking for instance, the example of a magnetic recording/reproducing device suitable for use with a video tape recorder for editing cassette tape for a 4-channel recording mode and cassette tape for a 2-channel recording mode, an upper cylinder 11A is installed on a head drum 11 rotatably as shown in FIG. 1, and a lower cylinder 11B is fixed to the lower part of the upper cylinder 11A.

The four (2 pairs) magnetic recording heads (hereafter "recording heads") W1+, W2−, W1−, W2+ are installed on the upper cylinder 11A, in mutual proximity along the rotation direction of the head drum 11. The recording heads W1+ and W2− are the lead heads while the recording heads W1− and W2+ are the lag heads.

Figure 2:
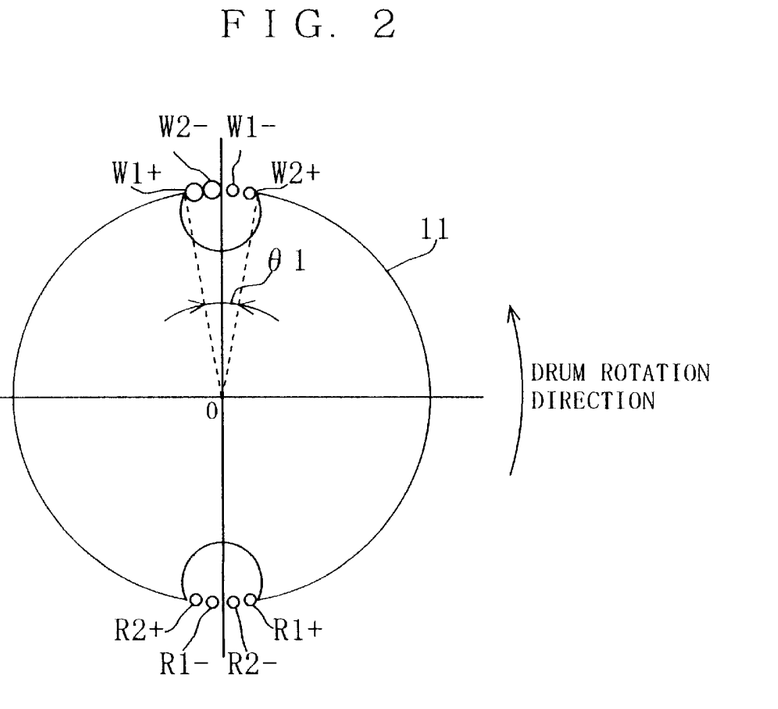
FIG. 2 is a drawing showing an example of arrangement of the recording heads W1+, W1−, W2+, W2− for 2-channel and 4-channel recording.

On the head drum 11 shown in FIG. 2, besides the recording heads W1+, W2−, W1−, W2+, two pairs of magnetic heads for reproducing (hereafter "reproduction heads") R1+, R1−, R2+, R2− are installed at positions 180 degrees away from the recording heads.

Figure 3:
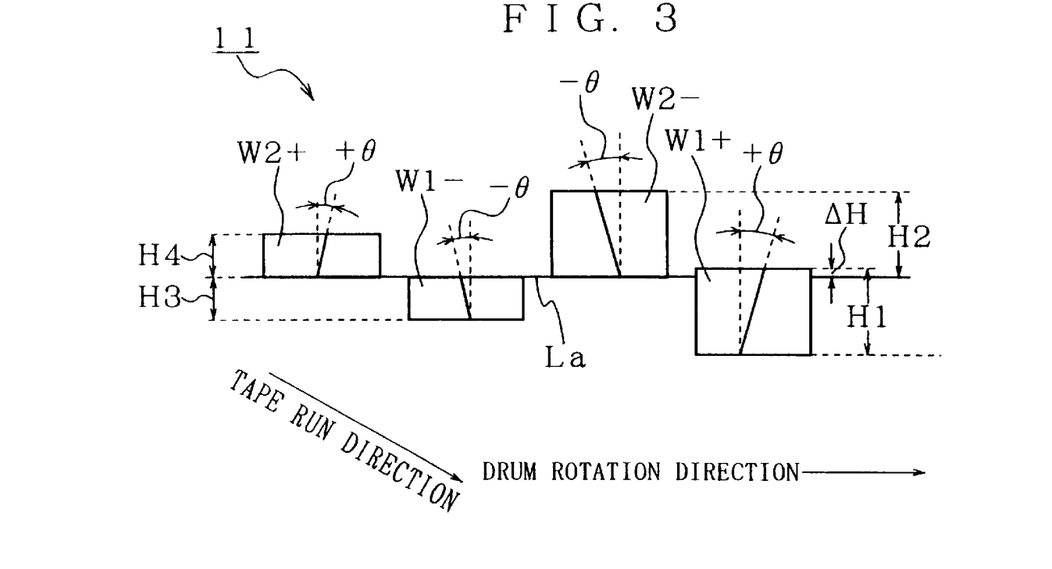
FIG. 3 is a diagram showing an example of arrangement of the four recording heads W1+, W2+, W1−, W2− for 2-channel and 4-channel recording.

A lead recording head W1+ is installed at the lower side of the imaginary common line La along the rotation direction of the head drum 11 as shown in the diagram in FIG. 3. A recording head W2− is installed on the upper side of the common line La, to the rear of recording head W1+. Also, in this example, the lower edge of the recording head W2− is arranged to overlap the upper edge of the recording head W1+ just by the amount ΔH.

The recording head W1+ and the recording head W2− are made to overlap so that a gap does not occur in the boundary between the magnetic recording zone (hereafter "track") of the recording head W1 and the recording track of recording head W2−. Of course, the upper edge of the recording head W1+ and the lower edge of the recording head W2− can be completely aligned so that the recording head W1+ and the recording head W2− do not overlap.

Further, rearward of the recording head W2−, the recording head W1− is installed on the lower edge of the common line La, and the upper edge of the recording head W1− arranged along the common imaginary line La. Also, rearward of the recording head W1−, the recording head W2+ is installed on the upper edge of the common line La, and the recording head W2+ arranged along the common imaginary line La.

When setting the head width for the respective head gaps of the recording heads W1+, W2−, W1−, W2+, the head width for the lead recording head W1+ (first head width) is H1. The head width for the recording head W2− is H2. The head width (second head width) for the lag recording head W1− is H3. The head width for the recording head W2+ is H4.

The head widths H3, H4 respectively for the lag recording head W1− and recording head W2+ are approximately half the head width H2 of the recording head W2−. Incidentally, when a head width H2 of the recording head W2− is set to Hw, the head width Hw for the average household video tape recorder is about 20 to 60 μm while the respective head gaps are about 0.1 to 0.3 μm.

The recording heads W1+, W2−, W1−, W2+ have an azimuth angle θ so that crosstalk will not occur between adjacent heads just the same as in the conventional art. Accordingly, each of the azimuth angles for the recording head W1+ and the recording head W2− are set to mutually face opposite each other. The recording head W1− and the recording head W2+ are also set to mutually face opposite each other.

The installation pitch of the reproduction heads R1+, R1−, R2+, R2− are set to a track pitch equal to the recording track formed by the recording heads W1− and W2+ of the head widths H3, H4. The head widths of the reproduction heads R1+, R1−, R2+, R2− are slightly wider than the head widths H3 and H4 of the recording heads W1− and W2+.

In a 4-channel recording mode that simultaneously uses these 4 recording heads W1+, W2−, W1−, W2+, information is recorded on the tape 7 by the recording heads W1+, W2− prior to the recording heads W1− and W2+, and information is then recorded over this information by the follow up record heads W1− and W2+.

Figure 4:
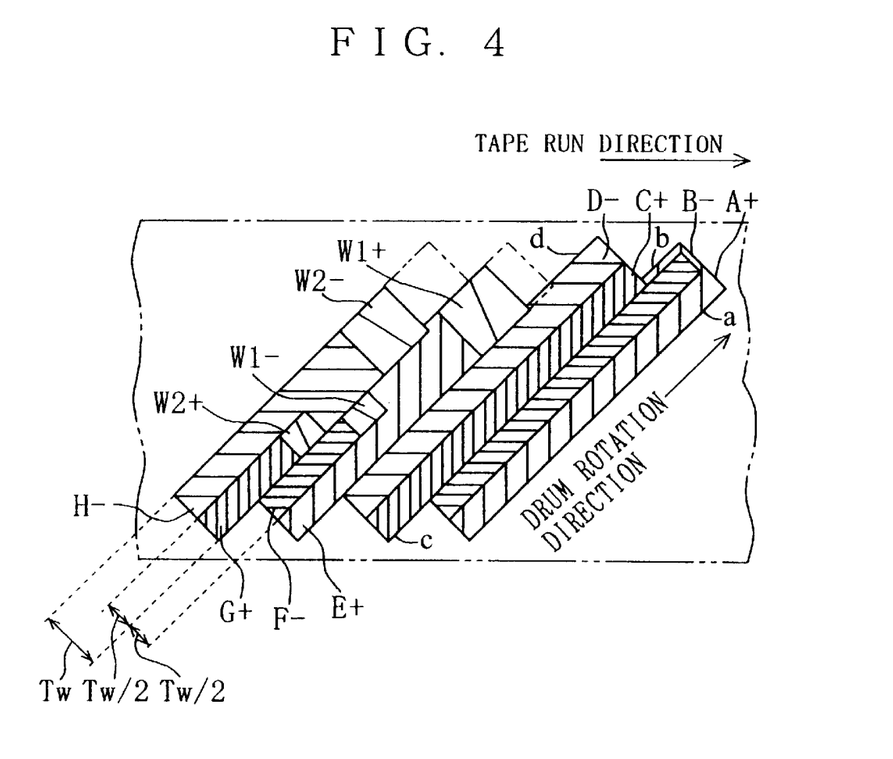
FIG. 4 is a drawing viewed from the rear, of the tape recording surface during recording of information in 4-channel record mode.

In other words, in the azimuth recording method for the 4-channel recording mode of this embodiment, when the head drum rotates, first, as shown in FIG. 4, the record information of the recording head pair W1+ and W2− is recorded first so that the track width Tw of the record track A+ is formed so as to overlap on the record track D−.

The record heads W1− and W2+ that follow-up on the record heads W1+ and W2− record information so as to overlap on both sides of the respective boundary lines a, b and c,d of the record tracks A+ and D−. As a result, the record track B− overwrites by a track width Tw/2 on the lower half of the zone for the record track A+. The record track C+ overwrites by track width Tw/2 on the zone of the upper half of the record track D−.

This overwriting serves to completely align the boundary lines of the record tracks B−, C+ by the record tracks W1−, W2+, with the boundary lines of the record tracks A+, D− by the record tracks W1+, W2−.

Thus, azimuth recording can be performed to continuously set the tape recording surfaces with no gaps for the recording tracks A+, B−, C+, D−, E+, F−, G+, H and so on, at a track width of Tw/2. Further, halved azimuth recording of the track pitch Tp for the recording tracks A+, D− can be performed.

Figure 5:
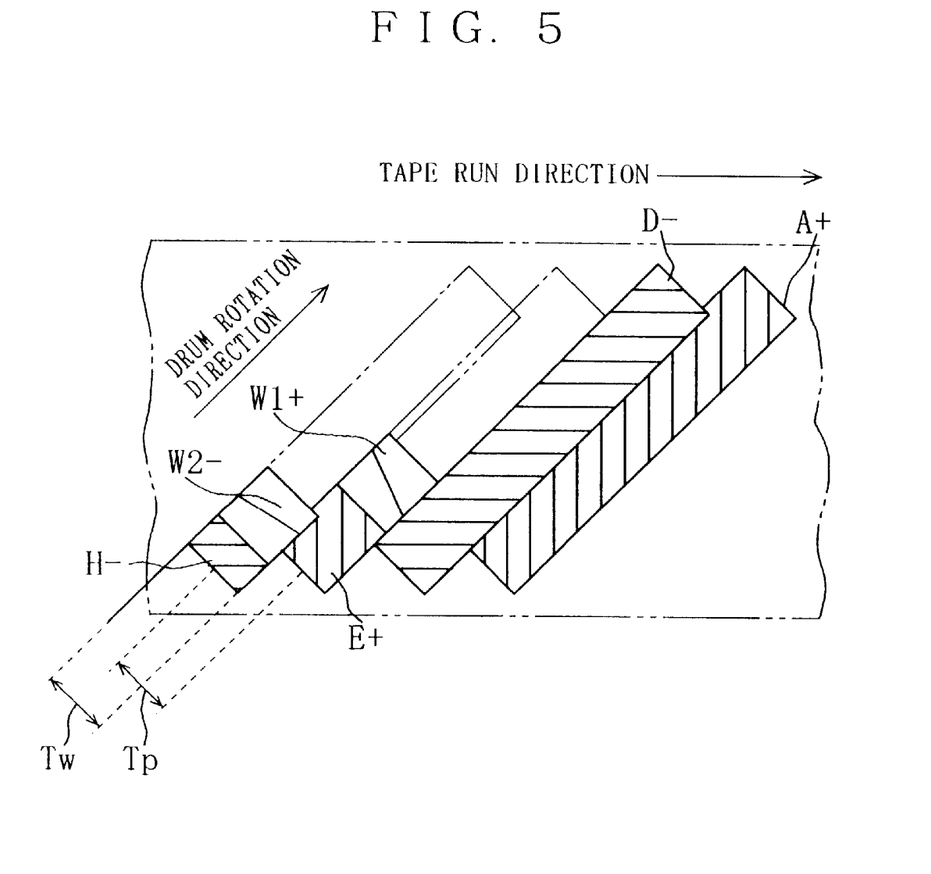
FIG. 5 is a drawing viewed from the rear, of the tape recording surface during recording of information in 2-channel record mode.

Besides 4-channel record mode in this embodiment, 2-channel record mode can also be performed. When performing 2-channel record mode only the wide width lead recording heads W1+, W2− are utilized. At this time, the recording tracks A+, D− at the track pitch Tp are formed as shown in FIG. 5.

Figure 6:
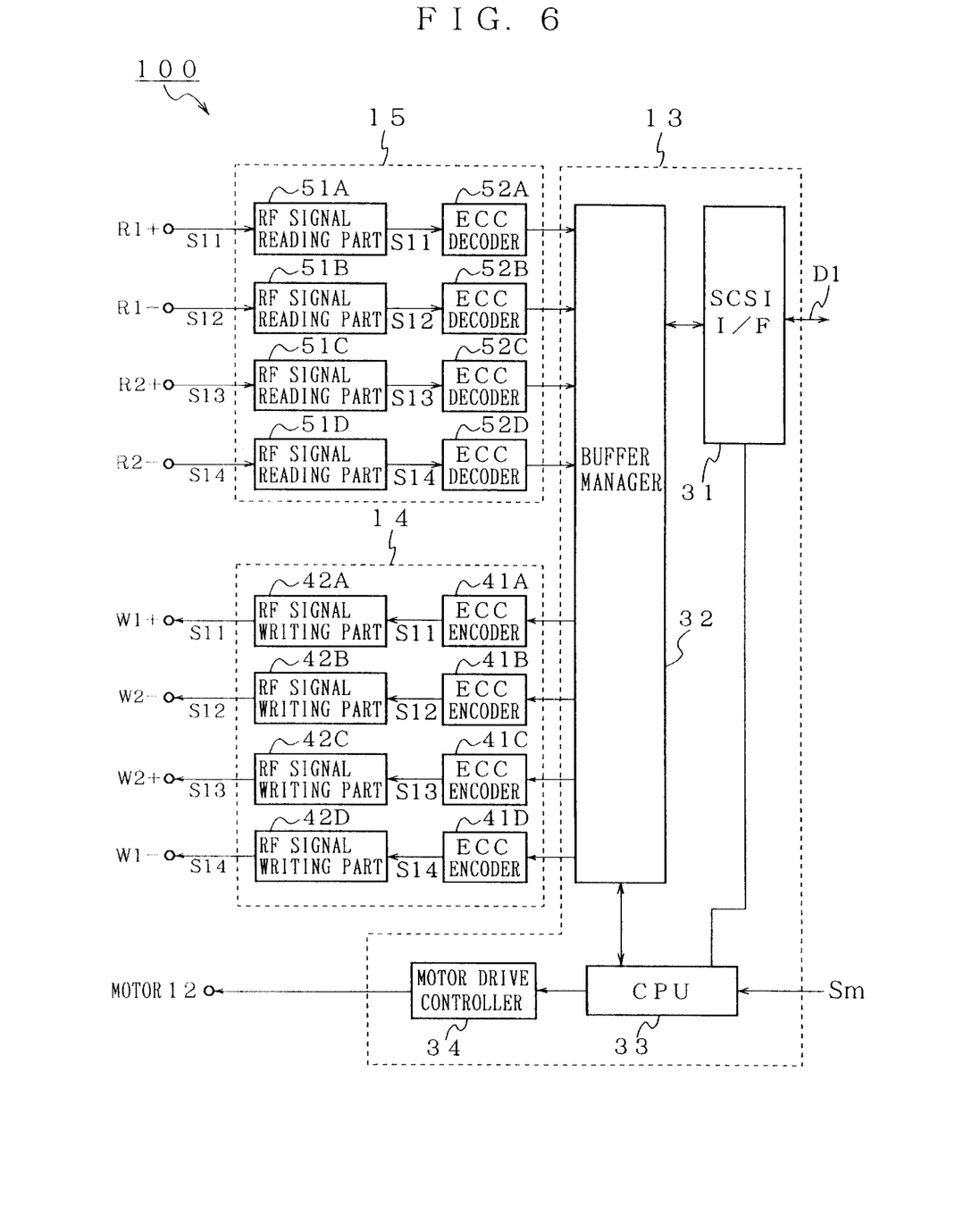
FIG. 6 is a drawing showing the drive control system of the magnetic recording/reproducing device.

The structure of the head drive control system 100 for driving the eight magnetic heads W1+, W2−, W1−, W2+, R1+, R1−, R2+, R2− is shown in FIG. 6. This head drive control system 100 is comprised of a recording/reproducing control 13, information writing part 14, and information readout part 15. Control is performed to perform azimuth recording and reproduction by means of the 2-channel or 4-channel record modes.

An SCSI interface 31, a buffer manager 32, a CPU (central processing unit) 33 and a motor drive controller 34 are installed in a recording/reproducing controller 13. An SCSI interface 31 is connected at the input stage of the recording/reproducing controller 13, and parallel audio and visual data (hereafter "record information") D1 is input from an external source during 2-channel record mode or 4-channel record mode. During reproduction mode, the parallel audio and visual data (hereafter "reproduction information") D1 is output externally.

The SCSI interface 31 is connected to the buffer manager 32 and the record information D1 is temporarily stored in the buffer manager 32 during record mode. The reproduction information D1 is temporarily is stored in the buffer manager 32 during reproduction mode.

The CPU 33 is connected to the SCSI interface 31 and the buffer manager 32 and control is performed to implement 2-channel record mode or 4-channel record mode based on a mode select command signal Sm received externally. A motor drive controller 34 is connected to the CPU 33, and a cylinder motor 12 is driven to rotate the head drum 11 at a fixed speed (30 revolutions a second for NTSC video system and 25 revolution for the PAL system (25 frames per second, 50 fields)).

Besides this cylinder motor 12, the capstan motor for moving the tape 7, and a loading motor (not shown in drawing) for winding the tape 7 on the head drum 11 are also controlled by means of the motor drive controller 34. The tape 7 is run at a fixed speed (standard speed 33. 35 mm/s, ⅓rd speed of 11. 12 mm/s) by tape drive control from this motor drive controller 34.

A speed for the tape 7 of twice the Tw will be sufficient as the tape drive speed in 4-channel record mode for one rotation of the head drum 11. When the tape 7 is run at such a speed, a recording tracks B− and C+ can be formed with half the track width Tw by means of recording information with the lag recording heads W1− and W2+ on both sides of the boundary line of the recording track A+ and the recording track D− formed by means of recording information by means of the lead recording heads W1+ and W2− as shown in FIG. 4.

The information writing part 14 is connected to the output stage of the buffer manager 32. In the information writing part 14, an error check encoder 41A (hereafter "ECC") for error check coding corresponding to the record head W1+ and a high frequency (RF) signal writing part 42A are installed, an ECC encoder 41B and an RF signal writing part 42B are installed corresponding to the recording head W2−, an ECC encoder 41C and an RF signal writing part 42C are installed corresponding to the recording head W2+, and an ECC encoder 41D and an RF signal writing part 42D are installed corresponding to the recording head W1−.

In other words, an ECC encoder 41A is connected to the output stage of the buffer manager 32, and the record information D1 loaded serially is coded by the RF record signal S11. After this coding an error check code is added in the RF record signal S11. An RF signal writing part 42A is connected to the output stage of the ECC encoder 41A and the RF record signal S11 is amplified and output. A recording head W1+ is connected by way of a rotary transformer (not shown in drawing) to the output stage of the RF signal writing part 42A, and two-channel recording of information on the tape 7 is performed with the RF record signal S11.

In the same way, an ECC encoder 41B is connected to the output stage of the buffer manager 32. The serially loaded record information D1 is coded in the RF record signal S12. After coding, an error check code is added in the RF record signal S12. An RF signal writing part 42B is connected to the output stage of an ECC encoder 41B and the RF record signal S12 is amplified and then output. A recording head W2− is connected by way of a rotary transformer (not shown in drawing) to the output stage of the RF signal writing part 42B, and two-channel recording of information on the tape 7 is performed with the RF record signal S12.

Similarly, an ECC encoder 41C is connected to the output stage of the buffer manager 32. The serially loaded record information D1 is coded in the RF record signal S13. After coding, an error check code is added in the RF record signal S12. An RF signal writing part 42C is connected to the output stage of an ECC encoder 41C and the RF record signal S13 is amplified and then output. A recording head W2+ is connected by way of a rotary transformer (not shown in drawing) to the output stage of the RF signal writing part 42C, and four-channel recording of information on the tape 7 is performed with the RF record signal S13.

In the same way, an ECC encoder 41D is connected to the output stage of the buffer manager 32. The serially loaded record information D1 is coded in the RF record signal S14. After coding, an error check code is added in the RF record signal S14. An RF signal writing part 42D is connected to the output stage of an ECC encoder 42D and the RF record signal S14 is amplified and then output. A recording head W1– is connected by way of a rotary transformer (not shown in drawing) to the output stage of the RF signal writing part 42D, and four-channel recording of information on the tape 7 is performed with the RF record signal S14.

Figure 7:
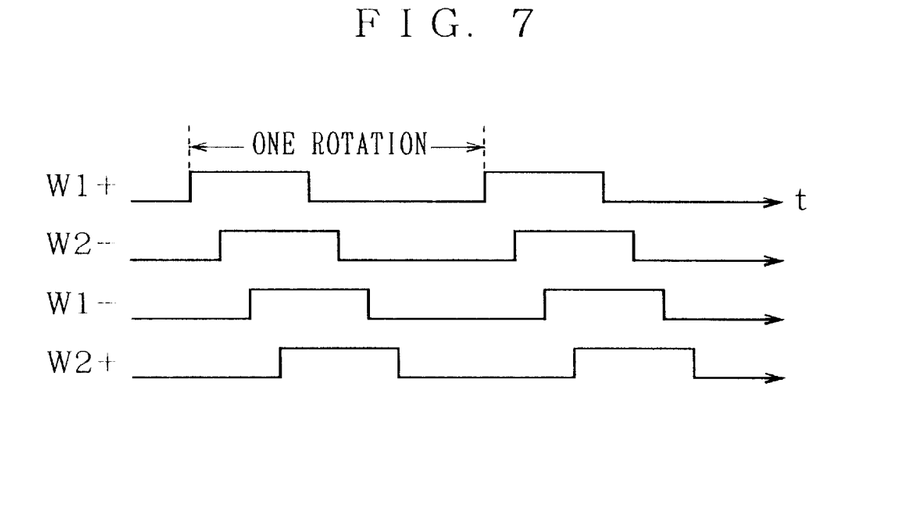
FIG. 7 is a timing chart showing the output timing of the W1+, W2−, W2+, W2− recording heads during 4-channel recording.

The output timing for the RF record signals S11–S14 which were signal processed in the information writing part 15 are shown in FIG. 7. When 4-channel record mode is selected, twice the information can be recorded on the same length of the tape 7 compared to the 2-channel record mode.

Also, the information readout part 15 is connected to the reproduction heads R1+, R1–, R2+, R2– of the head drum 11 by way of the rotary transformer as shown in FIG. 2.

An error check code (hereafter "ECC") encoder 51A and an RF signal reading part 52A are installed in the information readout part 15 corresponding to the reproduction head R1+. An ECC encoder 51B and an RF signal reading part 52B are installed in the information readout part 15 for the reproduction head R1–. An ECC encoder 51C and an RF signal reading part 52C are installed in the information readout part 15 for the reproduction head R2+. An ECC encoder 51D and an RF signal reading part 52D are installed in the information readout part 15 for the reproduction head R2–.

In other words, an RF signal reading part 51A is connected to the output stage of the reproduction head R1+ by way of the rotary transformer and the RF reproduction signal S11 read out during 2-channel reproduction mode is amplified and then output. An ECC decoder 52A is connected to the output stage of the RF signal reading part 51A. After the RF reproduction signal S11 is error checked, coding is performed in the reproduction information D1. This reproduction information D1 is output to the buffer manager 32.

Similarly, an RF signal reading part 51B is connected to the output stage of the reproduction head R1– by way of the rotary transformer and the RF reproduction signal S12 read out during 4-channel reproduction mode is amplified and then output. An ECC decoder 52B is connected to the output stage of the RF signal reading part 51B. After the RF reproduction signal S12 is error checked, coding is performed in the reproduction information D1. This reproduction information D1 is output to the buffer manager 32.

In the same way, an RF signal reading part 51C is connected to the output stage of the reproduction head R2+ by way of the rotary transformer and the RF reproduction signal S13 read out during 4-channel reproduction mode is amplified and then output. An ECC decoder 52C is connected to the output stage of the RF signal reading part 51C. After the RF reproduction signal S13 is error checked, coding is performed in the reproduction information D1. This reproduction information D1 is output to the buffer manager 32.

Similarly, an RF signal reading part 51D is connected to the output stage of the reproduction head R2– by way of the rotary transformer and the RF reproduction signal S14 read out during 2-channel reproduction mode is amplified and then output. An ECC decoder 52D is connected to the output stage of the RF signal reading part 51D. After the RF reproduction signal S14 is error checked, coding is performed in the reproduction information D1. This reproduction information D1 is output to the buffer manager 32.

The reproduction information D1 stored in this buffer manager 32 is output to external equipment in parallel to the display or the like from the SCSI interface 31 as audio-video data.

Figure 8:
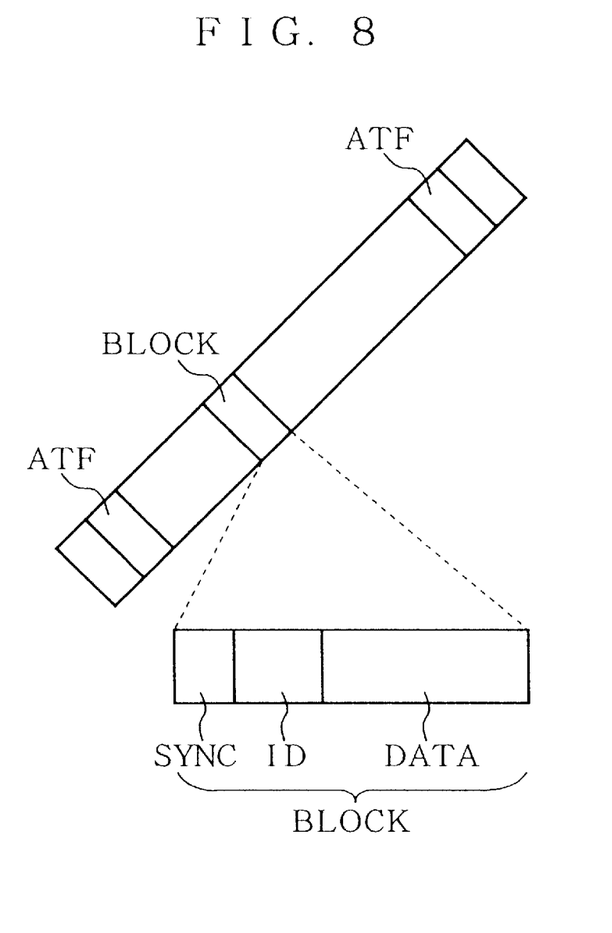
FIG. 8 is a drawing showing the recording track data format.

The data format for recording information such as audio-video data on the tape 7 is shown in FIG. 8. Control information record zones and reproduction information record zones are allotted to one record track. ATF information required for tracking, is recorded in the control information record zone. The reproduction information record zone is divided up into a plurality of blocks, with one block comprised of three zones which are the synch, ID and data zones as shown in the figure.

Information showing data such as for the start of a block for signal reproduction is written in the synch zone. Information such as the block address is respectively written in the ID zone. The information D1 (audio-video data) such as from host computer, video camera or television (media source) is written in the data zone.

Second Embodiment

Figure 9:
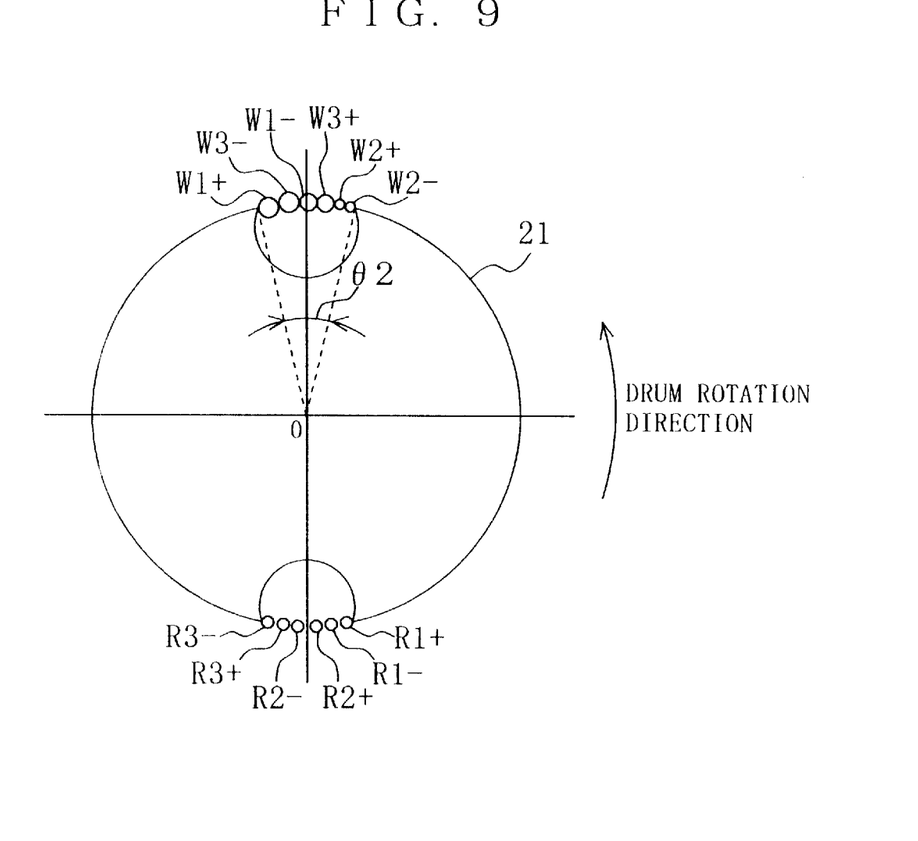
FIG. 9 is drawing showing a arrangement example of recording and reproduction heads for 2, 4 and 6 channel recording in the second embodiment of this invention.

FIG. 9 is drawing showing the arrangement of recording and reproduction heads for 2, 4 and 6 channel record modes in the second embodiment of this invention.

In this embodiment, a magnetic head pair of a second head width which is narrower than a first head width, records information onto both sides of the boundary lines of the recording track of the tape recording medium already recorded upon by the magnetic head pair of the first head width and further, a magnetic head pair of a third head width narrower than the second head width, records information onto both sides of the boundary lines of a recording track of the tape recording medium already recorded upon in the middle by the magnetic head pair of a second head width. This arrangement allows incorporating in one piece of equipment a 2-channel record mode for recording information using only the recording head pair of the first head width, and a 4-channel recording mode for recording information simultaneously using both the recording head pair of the second head width and the recording head pair of the first head width, and a 6-channel recording mode for recording information simultaneously using the recording pair of the first head width, the recording head pair of the second head width, and the recording pair of the third head width.

Taking for instance, the example of a magnetic recording/reproducing device suitable for use with a video tape recorder for editing cassette tape for a 6-channel recording mode, cassette tape for a 4-channel recording mode and cassette tape for a 2-channel recording mode, three pairs of magnetic recording heads (hereafter "recording heads" W1+, W3–, W1–, W3+, W2+, W2– are installed on a head drum 11 as shown in FIG. 9.

The recording heads W1+, W3– are the lead heads, the recording heads W1–, W3+ are the intermediate heads, and the recording heads W2+, W2– are the lag heads. Besides the recording heads W1+, W3–, W1–, W3+, W2+, W2–, the three pairs of magnetic reproduction heads (hereafter "reproduction heads") R1+, R1–, R2+, R2–, R3+, R3– are installed at a position 180 degrees away.

Figure 10:
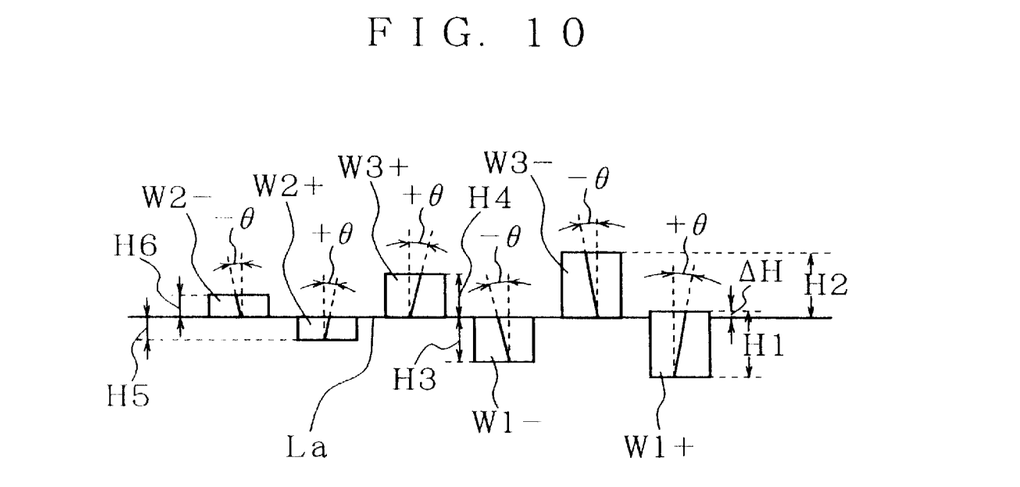
FIG. 10 is a diagram showing a arrangement example of the W1+, W3−, W1−, W3+, W2+, and W2− recording heads for 2, 4 and 6 channel recording.

Next, as shown by the drawing of the head gap surface in FIG. 10, a lead recording head W1+ is installed at the lower side of the imaginary common line La along the rotating direction of the head drum 21. Towards the rear of these heads, the recording head W3– is installed at the upper side of the imaginary common line La. In the example given here, the lower edge of the record head W3− is arranged to overlap the upper edge of the record head W1+ just by an amount ΔH.

The recording head W1+ and the recording head W3− are made to overlap for the same reason as in the first embodiment. Needless to say, the upper edge of the recording head W1+ and the lower edge of the recording head W3− can be completely aligned so that the recording head W1+ and the recording head W3− do not overlap.

Further, rearward of the recording head W3−, the intermediate recording head W1− is installed on the lower edge of the common line La, and the upper edge of the recording head W1− is aligned along the common imaginary line La. Also, rearward of the recording head W1−, the recording head W3+ is installed on the upper edge of the common line La, and the lower edge of the recording head W3+ is aligned along the common imaginary line La.

Also, the lag recording head W2+ installed along the lower edge of the imaginary common line La, to the rear of the recording head W3+, and the upper edge of the recording head W2+ is aligned with the imaginary common line La. To the rear of this recording head W2+, a recording head W2− is installed on the upper side of the common line La, and the lower edge of the recording head W2− is aligned with the common line La.

When setting a head width as the head gap of each of these six recording heads W1+, W3−, W1−, W3+, W2+, W2−, the head gap of the lead record head W1+ (first head width) is H1 and the head width of the record head W3− is H2. The head width (second head width) of the intermediate record head W1− is H3. The head width of the record head W3+ is H4. The head width of the lag record head W2+ (third head width) is H5. The head width of the record head W2− is H6.

The intermediate head W1− and the record head W3+ have a head width H3. Head width H4 is approximately two-thirds the head width of the record head W3−. Here, setting the head width H2 of the lead record head W3− as Hw, then H3=H4=2·Hw/3. The head widths H5, H6 for respectively, the lag recording heads W2+ and record head W2− are approximately one-third the head width of the lead record width W3−. So that H5=H6=Hw/3.

Just as in the first embodiment, an azimuth angle θ has been added to the recording heads W1+, W3−, W1−, W3+, W2+, W2− in order to prevent crosstalk from occurring between the adjacent heads. Accordingly, the azimuth angles for each of the record heads W1+ and record heads W3− face in mutually opposite directions. The azimuth angles for the record heads W1− and record heads W3+ also face in mutually opposite directions. The azimuth angles for the record heads W2+ and record heads W2− also face in mutually opposite directions.

The installation pitch for the reproduction heads R1+, R1−, R2+, R2−, R3+, R3− is equivalent to the track pitch of the record track formed by the recording heads W2+, W2− of head width H5, H6. In this embodiment, the head width of the reproduction heads R1+, R1−, R2+, R2−, R3+, R3− is slightly wider than the head width H5, H6 of recording heads W2+, W2−.

In the 6-channel recording mode simultaneously using these six recording heads W1+, W3−, W1−, W3+, W2+, W2−, information is recorded onto the tape 7 prior to the recording heads W1−, W3+, W2+, W2− by utilizing the recording heads W1+, W3−. Information is then recorded in an overlapping manner by these latter recording heads W1−, W3+, W2+, W2−.

Figure 11:
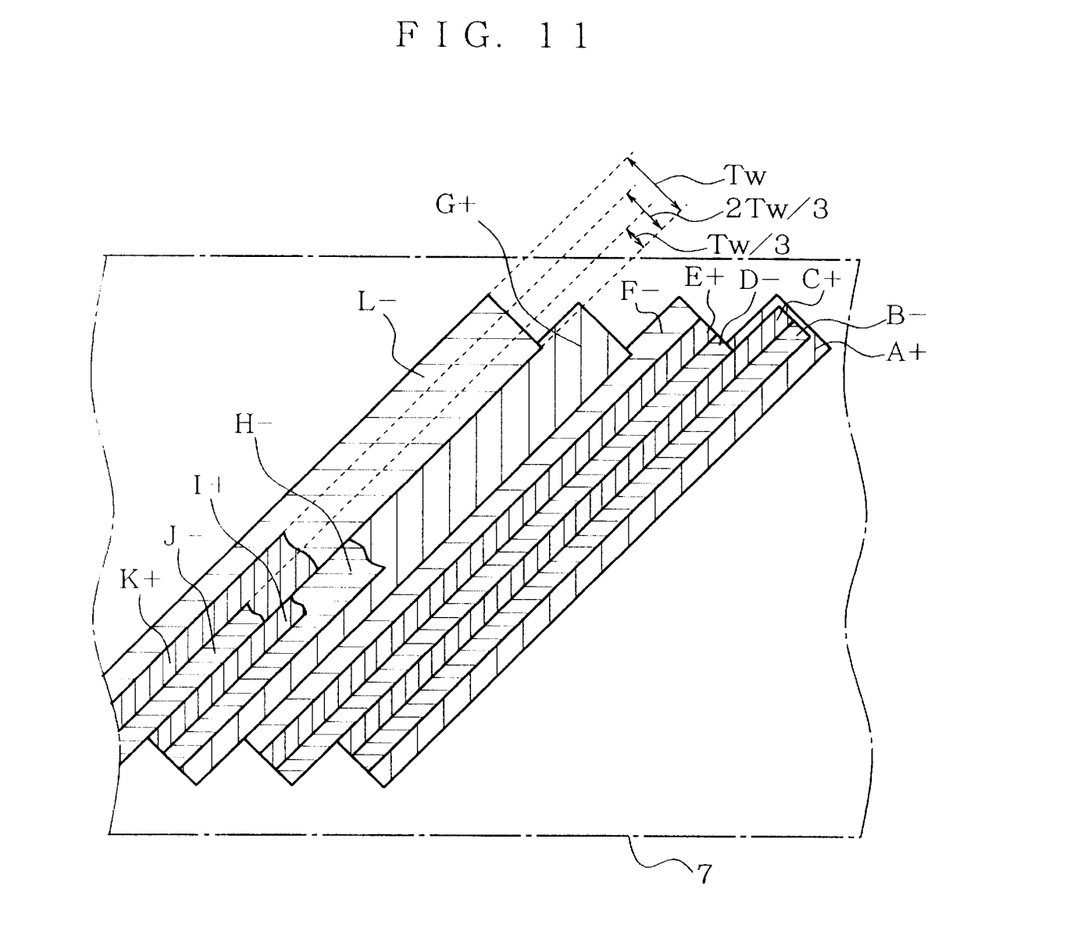
FIG. 11 is a drawing viewed from the rear, of the tape recording surface during recording of information in 6-channel record mode.

In other words, in the azimuth recording method in the 6-channel recording mode of this embodiment, when the head drum 21 makes one rotation, recording is first performed by the recording heads W1+, W3− as shown in FIG. 11, so that the track width Tw of the recording track A+ is formed so as to overlap on the record track F−.

Information is recorded in an overlapping fashion on both sides of the boundary lines of the record tracks A+, F− by the intermediate recording heads W1−, W3+ which follow up on the recording heads W1+, W3−. As a result, a track width 2·Tw/3 of record track B− is overwritten on the upper two-thirds region of the record track A+. Also, a track width 2·Tw/3 of record track E is overwritten on the lower two-thirds region of the recording track F−.

As a result of this overwriting, the boundary lines of record tracks B, E+ for recording heads, W1−, W3+ is completely aligned with the boundary line of record tracks A+, F− of the recording heads W1+, W3−.

The pair of recording heads W2+, W2− made to follow up on the recording heads W1−, W3+ record information in an overlapping manner onto both sides of the boundary line of record tracks B−, E+. As a result, a track width Tw/3 of record track C+ is overwritten on the lower half region of the recording track B−. Also, a track width Tw/3 of record track D− is overwritten on the upper half region of the record track E+.

As a result of this overwriting, the boundary lines of record tracks D−, C+ of the recording heads W2+, W2− and, the boundary lines for record tracks B−, E+ of the recording heads W1−, W3+, and the boundary lines for the record tracks A+, of the recording heads W1+, W3− are completely aligned with each other.

In this way, information can be consecutively recorded without gaps on record tracks A+, B−, C+, D−, E+, F−, G+, H−, I+, J−, K+, L− and so on at a track width Tw/3. Furthermore, azimuth recording such as a track pitch Tp divided into three parts for record tracks A+, F− can be recorded by the recording heads W1+, W3−.

When this arrangement is used to set a head width Hw of one-third that of the conventional art for the heads W2+, W2− which have the narrowest tracks, then approximately three times the previous information can now be recorded onto the same length of the tape 7 compared to the conventional art, thus allowing the tape to contain a much greater quantity of information.

When in 2-channel recording mode, only the recording heads W1+, W3− which have a wide width are used. The recording tracks A+, F−, G+, L− at track width Tw are formed at this time.

Similarly, the recording heads W1+, W3− and the recording heads W1−, W3+ are simultaneously used when recording in 4-channel recording mode. The record track A+ with a track width Tw/3, the record track B− with a track width 2·Tw/3, the record track E+, the record track F− with a track width Tw/3, the record track G+ with a track width Tw/3, the record track H− with a track width 2Tw/3 and record track K+, and record track L− with a track width of Tw/3 are formed at this time.

Thus, by using recording heads in multiples of two, and selecting the appropriate recording mode, the same magnetic recording/reproducing device can record information in multiples of two.

In the magnetic recording/reproducing device of this invention as explained above, two pairs of magnetic heads are installed in proximity along the direction of head drum rotation under specified installation conditions such that the upper edge of a magnetic head of a first head width, the lower edge of the other magnetic head of the first head width, the upper edge of one magnetic head of a second head width, and the lower edge of the other magnetic head of the second head width are aligned along a common line.

When the head drum is rotated in the specified direction with the two pairs of magnetic heads installed under these installation locations, information is first recorded onto the tape recording medium by the magnetic head pair of the first head width. Then, information can be recorded in an overlapping manner onto the both sides of boundary lines of the recording region by the prior recording by means of the magnetic head pair of the second head width.

Accordingly, a 2-channel recording mode with one pair of magnetic heads and a multichannel recording mode with another pair of magnetic heads can both be incorporated into one magnetic recording/reproducing device.

This type of magnetic recording/reproducing device is therefore ideal for use in video recorders for editing cassette tape for 2-channel record mode equipment and for editing cassette tape for multichannel record mode equipment used as the media source.

What is claimed is:

1. A magnetic recording device for recording information by diagonally scanning a head drum along the direction of a tape recording medium, comprising:

a head drum;

first and second recording heads of a first head width installed in mutual proximity along the rotation direction of said head drum, said first and second recording heads forming first and second magnetic recording zones on the tape recording medium having boundary lines;

third and fourth recording heads having a second head width narrower than said first head width and installed in proximity to said first and second recording heads; and an imaginary common line formed along the rotation direction of said head drum;

wherein said first, second, third and fourth recording heads are arranged on the imaginary common line while the upper edges of said first and third recording heads and the lower edges of said second and fourth recording heads are aligned with said imaginary common line, and wherein information recorded by said third and fourth recording heads overlaps both sides of the boundary lines of the first and second recording zones of the tape recording medium formed by the first and second recording heads.

2. A magnetic recording device according to claim 1, wherein said first and second recording heads face in mutually opposing azimuth angles, said third and fourth recording heads face in mutually opposing azimuth angles, and the azimuth angles of said second recording head and said third recording head face in the same direction.

3. A magnetic recording device according to claim 1, wherein said first and second recording heads are arranged so that the upper edge of the first recording head overlaps the lower edge of said second recording head by a small distance in the direction perpendicular to the direction of head drum rotation, and information is recorded in an overlapped manner by said third and fourth recording heads on both sides of the boundary line formed by the lower edge of said second recording head.

4. A magnetic recording device according to claim 1, further comprising mode selection means for selecting either a 2-channel recording mode using only said first and second recording heads or a 4-channel recording mode using said first and second recording heads, and also said third and fourth recording heads.

5. A magnetic recording device according to claim 1, including a fifth and a sixth recording heads narrower than said second head and in proximity to the said third and fourth recording heads on said head drum, wherein the upper edge of said fifth recording head and the lower edge of said sixth recording head are aligned with said imaginary common line, and information is recorded in an overlapped manner by said fifth and sixth recording heads onto both sides of the boundary line of the magnetic record zones formed previously on said tape recording medium by said third and fourth recording heads.

6. A magnetic recording device according to claim 5, wherein said fifth and sixth recording heads face in mutually opposing azimuth angles, and the azimuth angles of said fourth recording head and said fifth recording head face in the same direction.

7. A magnetic recording device according to claim 5, further comprising mode selection means for selecting a 2-channel recording mode using only said first and second recording heads, a 4-channel recording mode using only said first, second, third and fourth recording heads, or a 6-channel recording mode using said first, second, third, fourth, fifth and sixth recording heads.

* * * * *